United States Patent [19]

Cooper

[11] 4,144,562
[45] Mar. 13, 1979

[54] SYSTEM AND METHOD FOR INCREASING MICROPROCESSOR OUTPUT DATA RATE

[75] Inventor: Paul J. Cooper, Acton, Mass.

[73] Assignee: NCR Corporation, Dayton, Ohio

[21] Appl. No.: 809,496

[22] Filed: Jun. 23, 1977

[51] Int. Cl.$^2$ ............................................... G06F 3/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,821,715 | 6/1974 | Hoff, Jr. | 364/200 |
| 3,938,098 | 2/1976 | Garlic | 364/200 |

Primary Examiner—James D. Thomas
Attorney, Agent, or Firm—J. T. Cavender; Edward Dugas

[57] ABSTRACT

A system and method is disclosed wherein a microprocessor having an eight-bit data bus and a sixteen-bit address bus is interconnected with a peripheral device to which a certain amount of data must be transferred at a data rate greater than is possible by utilizing the eight-bit data bus to accomplish the transfer. The system includes a microprocessor, a memory, and a peripheral device interconnected by the eight-bit data bus, the sixteen-bit address bus and a read-write conductor. The peripheral device includes an address code recognition circuit coupled to the data bus and one of the address lines, and also includes a fifteen-bit buffer connected to fifteen lines of the address bus. The address code recognition circuit generates an output which is gated with the read-write conductor to generate a clock signal which enables the data on the address bus to be loaded into the fifteen-bit buffer, from which it may be utilized by the peripheral device. During two microprocessor read cycles, two eight-bit bytes of data are loaded from the memory into the microprocessor via the data bus. Fifteen of these sixteen bits constitute data to be rapidly transferred to the peripheral device, and one bit is programmed as an enable bit to be inputted to the address code recognition circuit. During another microprocessor read cycle, another eight-bit byte including a peripheral address code is loaded from the memory into the microprocessor via the data bus. During a first portion of a microprocessor write cycle, the fifteen bits of data to be transferred to the peripheral device and the enable bit are outputted on the address bus. During a second portion of the same write cycle, the peripheral address code is out-putted on the data bus. If the enable bit is programmed to be a "1", and the peripheral address code is the one that the address code recognition circuit is set up to recognize, the code recognition circuit generates an enable signal which in turn is ANDed with a write pulse from the read-write conductor to produce a clock enable signal which enables the fifteen bits of data to be loaded into the fifteen-bit buffer. The fifteen bits of data are then available for utilization by the peripheral device.

10 Claims, 3 Drawing Figures

SYSTEM AND METHOD FOR INCREASING MICROPROCESSOR OUTPUT DATA RATE

BACKGROUND OF THE INVENTION

1. Field of the Invention

The present invention relates generally to data processing systems and more particularly to increasing the data output rate of a processor.

2. Brief Description of the Prior Art

Many techniques exist in digital communications systems in which a central processor performs operations on digital data received from peripheral equipment at varying data rates. Various techniques for more effectively utilizing available memory capacity are known to the prior art. In certain applications, however, a peripheral device may require that data be supplied to it for a short period of time at a rate faster than is possible utilizing the data bus which interconnects the processor and memory. One technique for increasing the data output rate, by time-multiplexing the output address and the data lines of a data processor to increase the data word length decoded therefrom, is described in the copending patent application "System and Method for Increasing the Output Data Throughput of a Computer", Ser. No. 753,398, filed Dec. 22, 1976, assigned to the present assignee. However, the technique described in the latter application requires that the processor be dedicated, or uninterruptable, during the outputting of a data block or string to the peripheral device. The requirement that the processor be temporarily dedicated necessitates the use of additional hardware to ensure that none of the other peripherals or memory in the system respond to data being transferred to the addressed peripheral via the address bus and also additional hardware and/or software to ensure that the processor does not respond to any interrupts during the dedicated period.

SUMMARY OF THE INVENTION

It is an object of the invention to provide a system for increasing the output data rate of a processor.

It is another object of the invention to provide a system for increasing the data output rate of a processor by outputting data through the address bus of the processor, rather than through the data bus of the processor.

Another object of the invention is to provide a system wherein a peripheral device is addressed by means of a processor data bus and wherein data is transferred from the processor to the peripheral device by means of a processor address bus.

It is another object of the invention to provide a system for rapidly transferring data from a processor to a peripheral device without the requirement that transfer of a relatively large string of data to the peripheral device be continuous.

Another object of the invention is to provide a method for increasing the data output rate from a processor by loading a plurality of data bytes and a peripheral address code into the processor from a memory and outputting the data through an address bus to the peripheral device and outputting the peripheral address to the peripheral device through the data bus.

Briefly described, the invention is a processing system including a processor having a control output, a memory, and a utilization device interconnected by address lines and data lines operatively coupling the processor to the memory and to the utilization device. The processing system includes selection circuitry coupling the utilization device to a plurality of the data lines for selecting the utilization device in response to a certain code transferred to the selection means via the plurality of data lines. Buffer circuitry is provided coupling the utilization device to a plurality of the address lines for storing a data word transferred from the memory to the buffer circuitry along the plurality of address lines. Circuitry responsive to the control output and to the selection circuitry enables loading of the data word into the buffer circuitry during a time interval subsequent to the addressing of the utilization device. The data word is then available for utilization by the utilization device.

DESCRIPTION OF THE INVENTION

Figure 1:
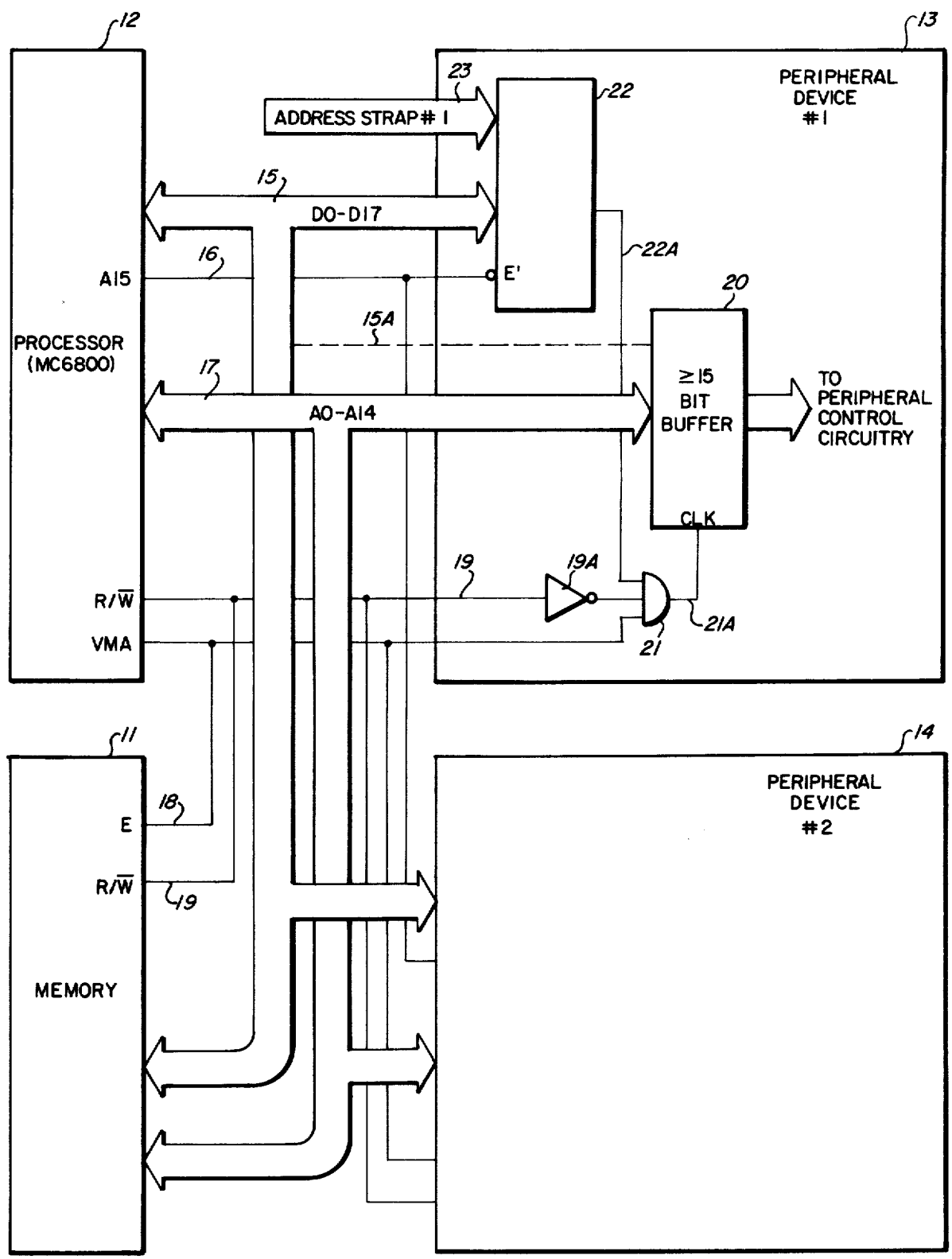
FIG. 1 is a block diagram of a presently preferred embodiment of the invention.
Figure 3:
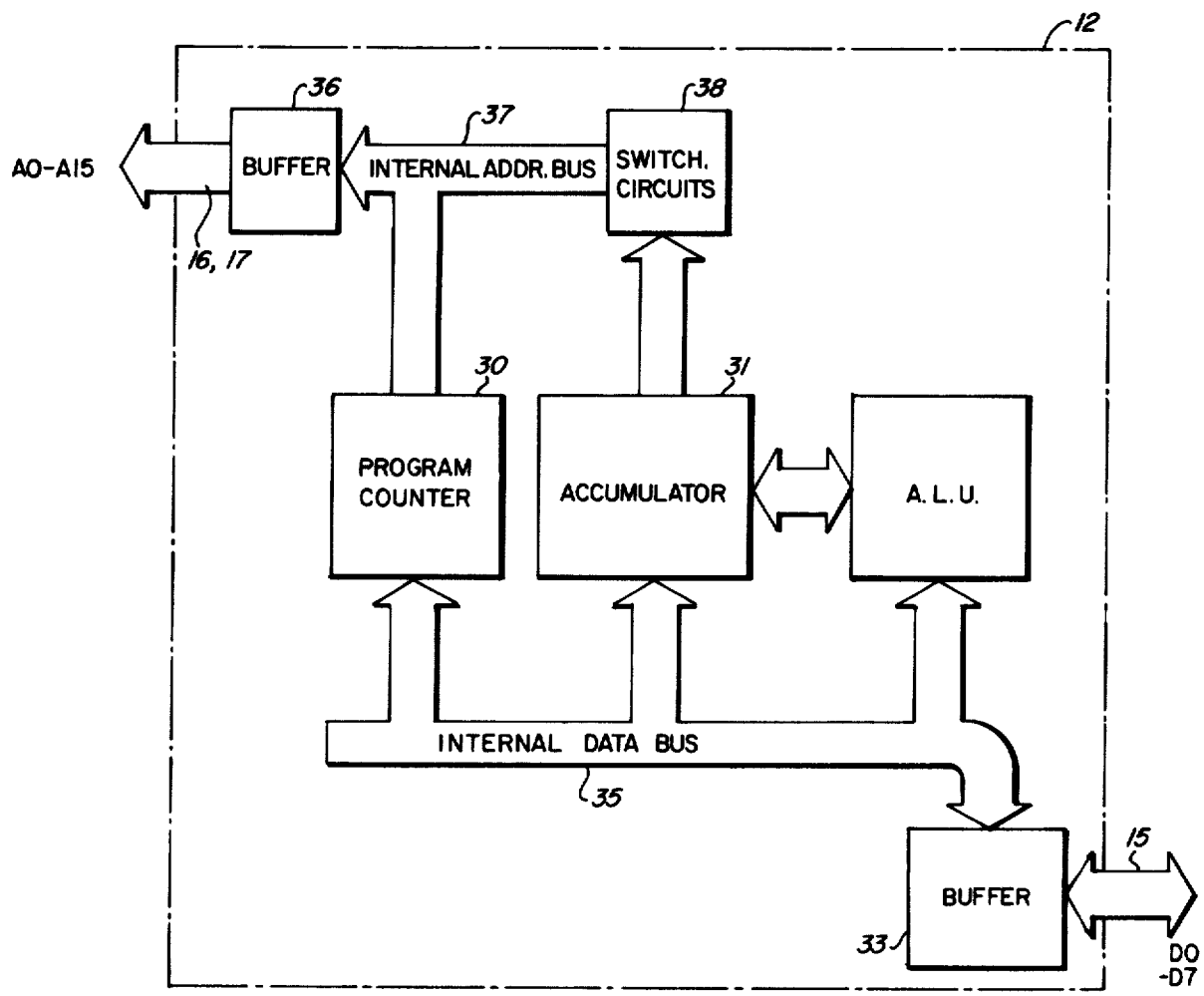
FIG. 3 is a block diagram depicting a portion of the internal structure of a microprocessor.

The presently preferred embodiment of the invention shown in FIG. 1 includes the system 10 which incorporates a processor 12, a peripheral device 13, a memory 11, and optionally, a peripheral device 14 all interconnected by an eight-bit bi-directional data bus 15, and also interconnected by an address bus 17 which includes fifteen conductors A0-A14. The processor address bus also includes conductor 16. Processor 12, in the embodiment chosen for illustration, is a Motorola MC6800 microprocessor, although with minor variations in interconnections, other commercially available microprocessors, such as the Intel 8080 could also be utilized. The MC6800 microprocessor and the programming thereof are described in the "MC6800 Microprocessor Programming Manual", 1975, copyrighted by Motorola, Inc., which is incorporated herein by reference. The MC6800 is also described in architectural detail in U.S. Pat. 3,962,682, also incorporated herein by reference. Portions of the internal structure of the processor 12 are shown in FIG. 3. Memory 11 can be readily implemented by those skilled in the art utilizing a wide variety of commercially available memory circuits, including random access memory circuits and read only memory circuits. For example, any portion of memory 11 which is implemented as read only memory could be provided using a Motorola MCM6830 1024-by-8 ROM, and the RAM portions of memory 11 could be implemented utilizing the MCM6810 128-by-8 RAM, or the Intel 1103 1024-by-1 RAM.

Additional elements, not shown, could readily be added to the system shown in FIG. 1. For example, additional peripheral devices could be coupled to data bus 15 and address bus 16, 17 by means of peripheral interface adapters such as the one described in U.S. Pat. No. 3,979,730 and U.S. Pat. No. 4,003,283, which are also incorporated herein by reference. Peripheral device 13 could be any type of peripheral device commonly controlled by a computer, such as a printer, a plotter, a CRT display, or industrial control device. Feedback from the peripheral device 13 to the processor could be accomplished by means of data bus 15, although the main emphasis of the present disclosure is to describe a novel structure and method for increasing the data output rate from the processor 12 to the peripheral device 13. Peripheral device 14 has been added to indicate how expansion of the system could be readily accomplished.

Peripheral device 13 includes a peripheral address code recognition circuit 22 which can be "wired" by means of address strap 23 to recognize a particular peripheral address code on data bus 15, under the condition that the A15 conductor 16, which is connected to enable input E' of code recognition circuit 22, has a particular logic level, i.e., a "0", thereon. Under these conditions, an output signal will be generated on conductor 22A. Address recognition circuit 22 could be readily implemented by those skilled in the art by means of eight conventional comparator circuits, each having an input connected to a respective one of the data bus conductors D0–D7 and each having a reference input connected to one of the eight conductors of address strap 23, each of the address strap conductors being wired, respectively, to either a logical 1 or 0 reference potential in order to determine which address code is to be recognized.

Peripheral device 13 also includes fifteen-bit buffer circuit 20 having outputs coupled to peripheral control circuitry (not shown) which utilizes data supplied to peripheral device 13. Buffer circuit 20 has its fifteen inputs coupled to conductors A0–A14 of address bus 17. Digital information present on conductors A0–A14 is loaded into the respective bits of buffer circuit 20 upon the occurrence of a clock signal produced on conductor 21A by AND gate 21. Such a clock signal will be produced on conductor 21A upon the coincidence of the presence of a recognition signal on conductor 22A, a logical "0" on read-write conductor 19 (which corresponds to a microprocessor write cycle and is inverted logically by logic gate 19A), and a logical "1" on VMA (Valid Memory Address) conductor 18, which serves as a strobe signal to the system, and is connected to the enable input E' of memory 11.

The operation of the system of the present invention is as follows. This description may be facilitated by reference to FIG. 3 which shows a schematic block diagram of a typical processor, such as the Motorola MC6800, which may be incorporated in the present invention. Specifically, the processor includes a program counter 30, an accumulator 31, and an A.L.U. 32, connected to a buffer 33 through an internal data bus 35. The program counter is connected to buffer 36 through an internal address bus 37; similarly, accumulator 31 may be connected to the buffer 36 through the same internal address bus 37 with the assistance of switching circuits 38. It will be understood by those skilled in the art that other processor arrangements may be used and that processors made by various manufacturers will have architectural variations although the basic functional block relationships are likely to be the same.

In the discussion of the operation of the present system, the processor 12 may be considered to be operating so as to execute a program stored in memory 11. During the course of such operation, numerous tasks and associated computations and data manipulations may be occurring as information is received from various peripheral devices other than device 13 in the system via the data bus 15. Such peripherals are addressed by means of address conductors A0–A14 and A15. At some point, for example, in response to an interrupt request by peripheral device 13, it may become necessary to rapidly transfer fifteen bits of data from processor 12 to peripheral device 13. The transfer must be accomplished more quickly than could be achieved by transferring the data via data bus 15. The data that must be transferred to peripheral device 13 must be loaded into an appropriate register, such as program counter 30, within the processor 12. Since only one eight-bit byte at a time can be loaded into processor 12 via data bus 15, at least two machine cycles are required to transfer the two data bytes from memory 11 via data bus 15 into the program counter 30 of processor 12. One more machine cycle is required to fetch the peripheral address code from memory and load it into the accumulator 31 of processor 12.

It can be seen that the rapid transfer of data from processor 12 to peripheral device 13 is accomplished by reversing the usual procedure for addressing a peripheral. Ordinarily, a peripheral is addressed via the address bus, and data is outputted to the peripheral via the data bus during a processor write cycle. In other words, address information is loaded into or calculated by a program counter, and data is loaded into or computed by the accumulator. In contrast, according to the present invention, address information is loaded into the accumulator or computed thereby, and data to be transferred to the peripheral device is loaded into or computed by the program counter.

Figure 2:
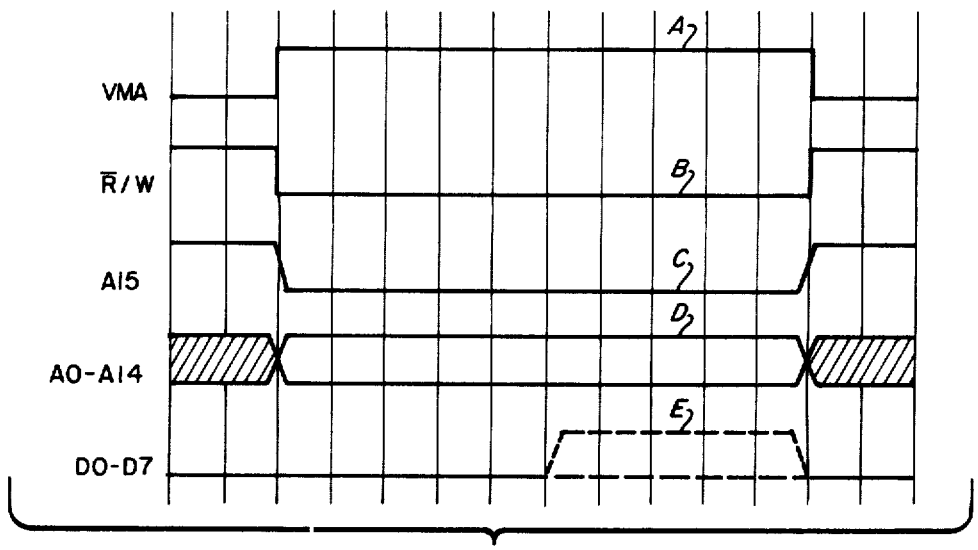
FIG. 2 is a timing diagram useful in explaining the operation of the invention according to the block diagram of FIG. 1.

Once the desired peripheral address code is in the accumulator and the desired fifteen bits of data are in the program counter, the addressing of peripheral device 13 via data bus 15 and the outputting of the fifteen bits of data via address bus 17 are all accomplished in a single machine cycle as processor 12 effects a write operation by means of a write signal B on conductor 19, as indicated in the timing diagram of FIG. 2. It should be noted that the manner and order of getting the data into the program counter and the peripheral address code into accumulator is not crucial. In fact, keeping such information in the 6800 in this manner appears very attractive since all that is required is to "pop" the stack (see Motorola's MC6800 Manual) whenever executing the program in memory 11.

Once the fifteen bits of data are loaded into buffer circuit 20 of peripheral device 13, the desired transfer of data is complete. This transfer of data into buffer circuit 20 is accomplished as follows. First, address code recognition circuit 22, which may be essentially a comparator, upon recognition of the peripheral address code, indicated generally by E in FIG. 2, as it is outputted on data bus 15, and upon presence of a logical "0" on A15 (logic level C in FIG. 2), generates a logical "1" on conductor 22A. It should be noted that the signal present on A15 is determined by the programmer, and is a logical "0" when the peripheral devices such as 13 and 14 are being addressed, and is a logical "1" when memory 11 is being addressed. During the processor write cycle, a logical "0", indicated by B in FIG. 2, is present on read-write conductor 19, causing another logical "1" to appear at the second input of AND gate 21. The strobe pulse A on conductor 18 generated by the processor VMA output provides the third necessary logical "1" input to AND gate 21, generating the clock signal on conductor 21A, enabling the fifteen bits of data (indicated generally by D in FIG. 2) on address bus 17 to be clocked into buffer 20. The transfer of data from processor 12 to peripheral device 13 has thus been accomplished in one machine cycle. Of course, it is irrelevant how the peripheral address code is produced in the accumulator of processor 12, and it is irrelevant how the fifteen bits of data to be transferred to the peripheral are provided in the program counter of processor 12. Both the fifteen bits of data and the address peripheral code may be fetched from memory, as described in the foregoing, or, for example, the fifteen bits of data and the peripheral address code may be computed from other information in processor 12.

It is especially important that the above described system and method of operation permit the rapid transfer of data to the peripheral device without requiring that the processor be disabled from accomplishing any other tasks. In other words, as soon as the fifteen bits of data described above is transferred, processor 12 can switch over to perform some other tasks, and return later to transfer another fifteen bits.

A minor modification to the structure of FIG. 1 may be made, wherein A15 is also connected to buffer 20, and buffer 20 is modified to provide sixteen bits instead of fifteen. Then, two full eight-bit bytes of data may be transferred during a single machine cycle.

It should be noted that if not all of the lines D0-D7 of data bus 15 are required as a peripheral address code, the ones that are not so required may also be used to transfer data to buffer 20, which, of course, would then have to have more than fifteen bits. Connection 15A indicates generally the use of one or more lines of data bus 15 in such a manner. For example, if only one conductor of data bus 15 is required for the peripheral address code, because there are only one or two peripherals to which data must be rapidly transferred during one machine cycle, then the other seven data bus lines could be included in 15A and buffer 20 could be a 22 bit buffer, and a maximum of 22 bits of data could be outputted in one machine cycle to buffer 20. Further, only a one bit peripheral address comparator 22, and a one bit wired address strap 23 would be required.

What is claimed is:

1. A data processing system comprising:
   (a) a processor having a control output, said control output indicating in part a data word greater than the number of data lines;
   (b) a memory;
   (c) a utilization device;
   (d) address lines and data lines operatively coupling said processor to said memory, said address lines being substantially greater in number than said data lines;
   (e) selection means coupling said utilization device to a plurality of said data lines for selecting said utilization device in response to a code transferred to said selection means via said plurality of data lines and for producing an address code recognition signal in response to said code;
   (f) buffer means coupling said utilization device to a plurality of said address lines for storing a data word transferred from said processor to said buffer means via said plurality of address lines in response to said address code recognition signal by said selection means and the control output from said processor; and
   (g) means associated with said processor for enabling data flow from said processor to said address lines when the number of data lines is insufficient to carry a data word.

2. The data processing system according to claim 1 wherein said code is a peripheral address code.

3. The data processing system according to claim 1 wherein one of said address lines is coupled to said selection means and said selection means includes means responsive to said one of said address lines for enabling said selecting of said utilization device.

4. The data processing system as recited in claim 1 wherein at least one of said data lines is coupled to said buffer means to effect transferring a portion of said data word to said buffer means.

5. The data processing system according to claim 1 wherein said processor includes an accumulator coupled to said data lines for temporarily storing said code and includes program counter means coupled to said data lines and to said address lines for temporarily storing said data word.

6. A method of operating a data processing system, of the type having a larger number of address lines than data lines, so as to enable the transfer of a magnitude of data greater than that transferable on the data lines, comprising the steps of:
   (a) temporarily storing a peripheral address code in a processor;
   (b) temporarily storing a data word in said processor, said data word having a larger number of bits than said peripheral address code;
   (c) transferring said data word to a peripheral device via an address bus during a machine cycle;
   (d) transferring said peripheral address code to said peripheral device via a data bus during said machine cycle;
   (e) enabling loading of said data word into a buffer of said peripheral device in response to recognition of said peripheral address code by a code recognition circuit of said peripheral device.

7. The method set forth in claim 6 wherein said method includes the steps of fetching said peripheral address code and said data word from a memory via said data bus.

8. The method set forth in claim 6 wherein said method includes the steps of initially computing said data word prior to the temporary storing thereof and also includes the step of computing said peripheral address code prior to the temporary storing thereof.

9. The method set forth in claim 6 including the step of temporarily storing an address bit, in addition to said address code, in said processor and transferring said address bit to said peripheral device during said machine cycle to enable recognition of said peripheral address code by said peripheral device.

10. The method as recited in claim 6 further including the step of transferring a portion of said data word to said peripheral device via a portion of said data bus.

* * * * *